United States Patent [19]

Gartz, Jr. et al.

[11] 3,998,615
[45] Dec. 21, 1976

[54] GLASS MELTING FURNACE AND METHOD OF OPERATION

[75] Inventors: Clarence A. Gartz, Jr., Perrysburg; Millen E. Luhrs, Toledo, both of Ohio

[73] Assignee: Libbey-Owens-Ford Company, Toledo, Ohio

[22] Filed: Mar. 31, 1975

[21] Appl. No.: 563,620

[52] U.S. Cl. .................................. 65/29; 65/32; 65/162; 65/346
[51] Int. Cl.² ........................................ C03B 5/16
[58] Field of Search ............. 65/160, 161, 162, 29, 65/32, 346

[56] References Cited
UNITED STATES PATENTS

| 3,507,637 | 11/1975 | Javaux | 65/32 |
| 3,535,096 | 10/1970 | Bour et al. | 65/29 X |
| 3,860,407 | 1/1975 | Fertik | 65/61 |

*Primary Examiner*—Arthur D. Kellogg
*Attorney, Agent, or Firm*—Collins, Oberlin & Darr

[57] ABSTRACT

A regenerative tank-type furnace and a method for regulating the atmospheric pressure in its working end wherein the headspace above the molten glass contained in the tank at the melting end is separated from the headspace at the working end together with controllable means for regulating the atmospheric pressure in the headspace above the working end independently of the pressure in the headspace of the melting end. The furnace atmospheric pressure in the working end is sensed and compared with the ambient external atmospheric pressure outside the working end to produce a signal which is employed to make adjustments in the dampering of an exhaust system communicating the working end with the outside atmosphere. This makes it possible to control as desired the furnace atmospheric pressure above the molten glass in the working end and, as a result, prevent disturbing atmospheric currents from acting upon the molten glass contained in the tank and adversely affecting the quality of a glass ribbon formed therefrom.

5 Claims, 3 Drawing Figures

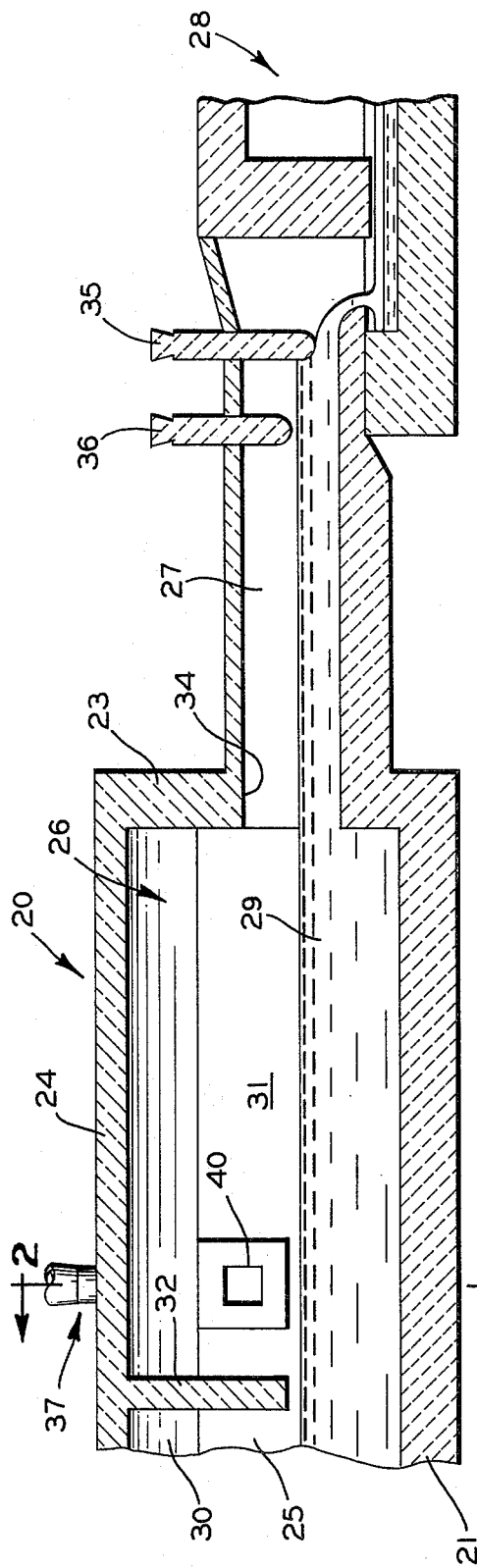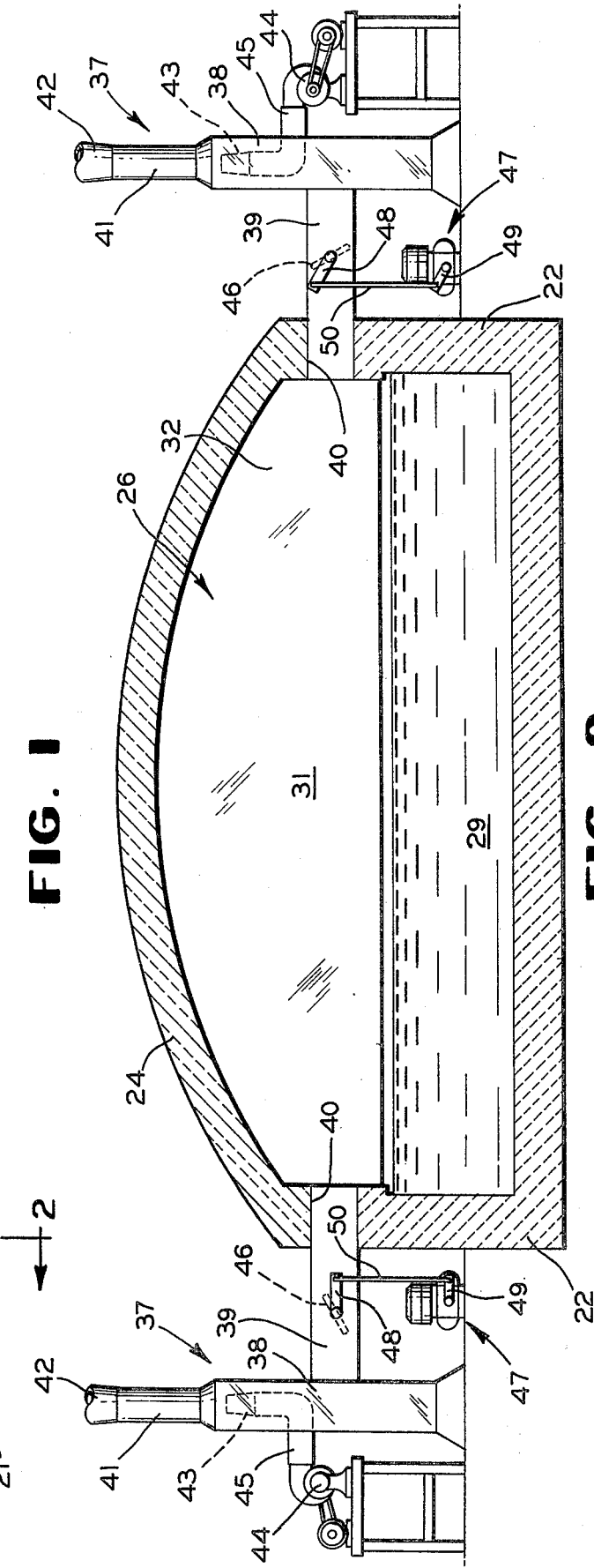

GLASS MELTING FURNACE AND METHOD OF OPERATION

BACKGROUND OF THE INVENTION

1. Field of the Invention

The present invention relates generally to the art of glass melting and, more particularly, to an improved apparatus and method for regulating the atmospheric pressure within the headspace above the molten glass in the working end of a glass melting furnace.

2. Description of the Prior Art

In a conventional glass melting furnace raw batch material and scrap glass or cullet are charged into one end of the furnace and molten glass is removed from its other end. The glass, in moving through the furnace, passes through a melting end and a working end which are contiguous with one another. Heat is applied over the upper surface of the bath of glass in the melting end for reducing the newly added materials to a molten state and integrating them into the flowing molten mass, and the molten glass is refined and cooled to a point where it can be removed from the furnace in a continuous ribbon in the working end.

It is common practice to separate the headspace above the molten glass in the melting end from the headspace above the molten glass in the working end by a partition wall or arch, so that the melting operation can be performed to best suit conditions therein without in any way affecting the molten glass in the working end. Accordingly, the headspace at the working end comprises a substantially closed chamber wherein pressure tends to build up because of processes occurring in the molten glass. Thus, this pressure build-up is not relieved by the exhaust system employed in the melting section of the furnace.

Practice has shown that as the pressure in the working end builds up to excessive levels, it tends to force furnace atmospheric gases into the area wherein the molten glass, by whatever process, is being formed into a final usable ribbon. This flow of furnace atmosphere tends, among other things, to produce optical defects in the glass ribbon known in the art as "wave" and "ream". Wave may be characterized as an undulating streak occurring repetitively on the surface of the glass while ream may be characterized as a narrow band within the glass that has an effective refractive index different from the surrounding glass. These optical defects may have their origin in the ongoing conditioning of the molten glass in the working end of the furnace. More particularly, wave and ream may occur when cold air drafts enter the working section and cool the top surface of the molten glass in a non-uniform manner. The non-uniform cooling of the top surface of the molten glass produces cold streaks and evidences itself as wave in the glass. Further, the bath of molten glass may be of slightly different composition and the non-uniform cooling of these compositions evidence themselves as ream in the final glass ribbon.

In the practice of this invention the pressurized atmospheric air in the working section of the furnace is maintained at a level which minimizes the above-mentioned causes of wave and ream in the finished glass ribbon. This is accomplished by maintaining the working end atmosphere at a pressure which is always slightly above the external atmospheric pressure, with no momentary reversals of this relationship as may occur in conventional furnaces. There is thus no ingress of cold external atmosphere and yet the internal atmosphere does not build up sufficient pressure so as to enter the sheet forming area.

The general concept of controlling an air pressure in a closed chamber by sensing the air pressure and then regulating the same by controlling the exhaust thereof is, of course, old. Also, it is known that the atmospheric air pressure in the melting area of a glass furnace can be controlled by dampering its chimney draft (see U.S. Pat. No. 3,373,007 and 3,584,851). However, the pressure requirement in the melting end of the furnace for efficient burner operation is different than the pressure requirement in the working end of a glass melting furnace which should be minimal for minimizing the occurrence of optical defects in a finished glass ribbon.

SUMMARY OF THE INVENTION

The present invention provides an improved glass melting furnace and a method of operation for conditioning molten glass for forming a glass ribbon. It has been found that the operation of a regenerative furnace with the novel pressure control of this invention has significantly improved the quality of the glass. Flat glass formed from molten glass so conditioned has been found to have noticeably fewer and less intense wave and ream defects than glass produced at the same facility without the pressure control provided by this invention.

The practice of this invention requires maintaining a controlled level of atmospheric pressure in the working end of a glass furnace. Generally speaking, a glass melting furnace according to this invention includes a closed tank whose headspace is divided into two sections by a partition wall or arch, that is, a section above the melting end which reduces glass making materials to a molten mass and a section above the working end which cools and conditions the molten glass to a usable form. Accordingly, the headspace above the working end is provided with at least one exhaust stack and means for sensing the atmospheric pressure within the headspace at a suitable location as well as the external ambient atmospheric air pressure surrounding the working end. Control means responsive to the pressure sensing means is used to make adjustments in the dampering of the exhaust stack. This makes it possible to control as desired the pressure level in the working end of the tank and, as a result, the thermal uniformity of the molten glass mass therein.

OBJECTS AND ADVANTAGES

Thus, an object of this invention is to substantially reduce the occurrence of optical defects in the production of a continuous glass ribbon.

A further object of this invention is to control and regulate the atmospheric pressure within the headspace above the working end of a glass melting furnace.

A further object of this invention is to provide new and improved means for regulating the internal pressure in the headspace above the working end independently from the pressure in the headspace above the melting end of a glass furnace.

Other objects and advantages of the invention will become more apparent during the course of the following description when taken in connection with the accompanying drawings.

BRIEF DESCRIPTION OF THE DRAWINGS

In the drawings, wherein like numerals are employed to designate like parts throughout the same:

FIG. 1 is a fragmentary longitudinal side elevation, sectional view of a tank-type glass melting furnace embodying this invention;

FIG. 2 is an enlarged transverse sectional view, taken substantially along line 2—2 in FIG. 1, showing the exhaust stacks in communication with the headspace above the working end of the furnace.

DESCRIPTION OF THE PREFERRED EMBODIMENT

Figure 3:
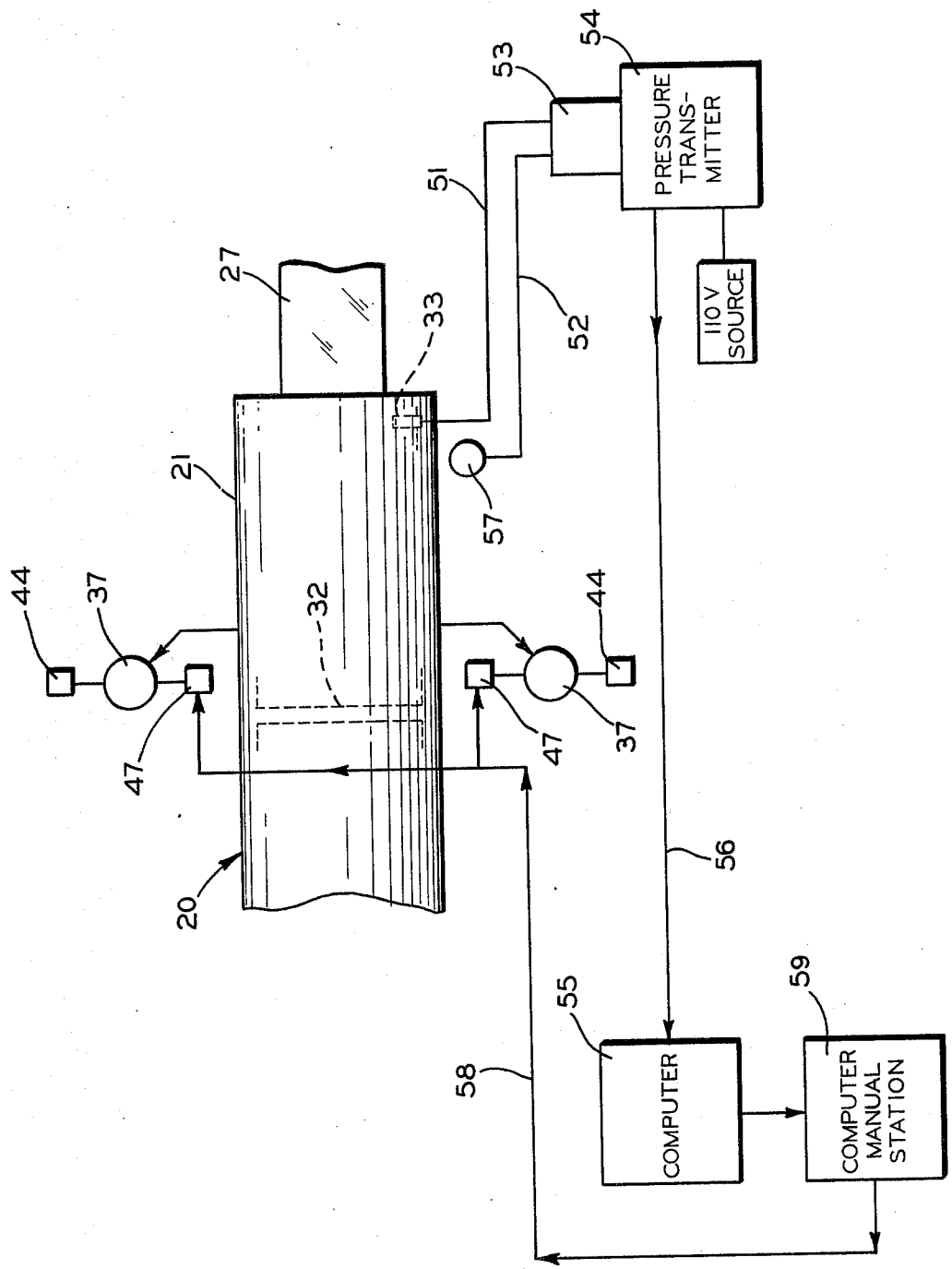
FIG. 3 is a fragmentary diagrammatic plan view of a furnace illustrating a control system embodying the teachings of this invention.

With reference to the drawings, and more particularly to FIGS. 1 and 2, there is shown a continuous tank-type regenerative glass melting furnace 20 in combination with which the present invention is especially suitable. It will be appreciated, however, that the novel arrangements herein disclosed may be employed in melting furnaces other than that of the continuous tank-type glass furnace shown.

Generally, such a glass melting furnace 20 includes a longitudinally extending tank 21 having opposed side walls 22, an end wall 23 and a roof 24. As is well known, raw glass making materials or batch, and cullet or scrap glass, are introduced into the doghouses of the furnace 20 by feeder devices and reduced to a molten state in its melting end 25. From the melting end they flow into a working end 26 and are thereafter removed from the opposite or exit end of the furnace, as here shown through a canal 27 connected to a float chamber 28, as a homogeneous molten material 29. It will be readily understood that although as herein illustrated the molten glass is removed from the furnace via a float chamber, the molten glass may be drawn from the molten mass as a continuous ribbon by other well known processes.

Heat for reducing the batch to a molten consistency within the melting end is provided by suitable means such as burners (not shown) which discharge hot flames and products of combustion through ports (not shown) opening into the melting end 25 above the level of the glass flowing therethrough. The headspace 30 above the molten glass 29 in the melting end 25 of the tank 21 is separated from the headspace 31 above the molten glass 29 in the working end 26 by a partition wall or arch 32 extending across the tank 21 and into close proximity to the top surface of the molten glass 29. Positioned within a side wall 22 at the downstream end of the working end 26 is a pressure sensing probe 33 (see FIG. 3) which is effective to detect the pressure of the atmosphere in the headspace 31 bearing on the top surface of the molten glass 29.

As best shown in FIG. 1, the end wall 23 is provided with a glass discharge opening 34 which is connected to the canal 27. The canal 27 is provided with a metering or control tweel 35 and a shut-off tweel 36 which are used to regulate the rate of molten glass flow from the working end 26 to the float chamber 28 or entirely stop the flow of molten glass, respectively. Thus, it is readily apparent that the working end 26 becomes a substantially enclosed sealed chamber, particularly if conventional floaters (not shown) are employed adjacent the partition wall 32. As previously indicated, the pressure of the atmosphere in the headspace 31 of the working end 26 can build up to excessive levels because of the natural process occurring in the cooling and conditioning of the molten glass therein.

In order to prevent the egress of the furnace atmosphere from the headspace 31 into the float chamber 28 in case a large positive pressure occurs therein, or the ingress of cool air drafts into the headspace 31 in case a negative pressure should occur therein, each of which conditions is undesirable in conditioning the molten glass 29, means is provided to regulate the atmospheric pressure in the working end headspace 31. Practice has shown that by maintaining a low positive pressure within the headspace 31, on the order of 0.01 inch of water, neither the furnace atmosphere will migrate from the working end nor cold atmospheric air drafts will infiltrate the working end and produce optical defects in the glass ribbon or molten glass, respectively. Also, the continuous maintenance of a low positive pressure in the headspace 31 inhibits the formation of thermally induced air currents occurring from the conditioning of the molten glass in the working end of the tank.

Accordingly, along each side wall 22 downstream of and adjacent to the partition wall 32, are ejector stacks 37 which place the headspace 31 in communication with the surrounding outside atmosphere. Referring now to FIG. 2, each ejector stack 37 comprises an upstanding tubular base 38 which is connected by a duct 39 via a port 40 to the headspace 31 of the working end 26, a throat portion 41 of reduced cross section, and a conical stack portion 42. Preferably, air is supplied to the ejector stack 37 at the base of the throat 41 by a nozzle 43 connected to a fan 44 through a conduit 45 for inducing a forced draft in the stack 37. However, a natural draft chimney will also suffice for this purpose. As here shown, each duct 39 is provided with a butterfly damper 46 which may be operated by a conventional reversible drive mechanism 47. The drive mechanism is operatively connected to the damper 46 by pivotal arms 48 and 49 and a connector link 50.

In the practice of the present invention, once a desired pressure level is established within the headspace 31 of the working end, it is maintained thereat by an appropriate control system which is illustrated in FIG. 3. Generally speaking, this control system comprises two pressure sensing means, one of them being the probe 33, which are connected by fluid conductor lines 51 and 52 via a manifold valve 53, to a conventional pressure transmitter 54. The pressure transmitter 54 analyzes and converts the two pressure signals to an electrical signal which is transmitted to a computer 55 via an electrical conductor line 56. The computer 55 which may be of a conventional analog type, a digital type, or a combination of the two, employs this signal to determine if any changes need be made in this working end exhaust system. The computer contains suitable circuitry to generate signals effective to control the operation of the drive mechanism 48 for moving the butterfly damper 46 to appropriate settings, thereby controlling the flow of furnace atmosphere from the headspace 31.

Accordingly, a pressure signal is received from the probe 33 within the headspace 31 by the pressure transmitter 54. This signal is compared with a pressure signal generated by an ambient air pressure detecting means 57 which is placed in close proximity to the probe 33 and whose pressure signal also is received by the transmitter 54 via the manifold valve 53. Thus, the transmitter 54 in accordance with practices already well known in the art, receives a pressure signal from the headspace 31 at a desired level and converts this pressure signal to an electrical signal. Since pressure transmitters of this type are commercially available, details thereof need not be described.

The electrical output signal from the transmitter 54 is transmitted, via the electrical conductor 56, to the computer 55 which computes the atmospheric pressure in the headspace 31 and compares it to a predetermined pressure level. If the computer determines that a change in the damper settings need be made to maintain the atmospheric pressure in the headspace 31 at a desired level, it transmits an appropriate output signal via an electrical conductor 58 to the drive mechanisms 47 to move the dampers 46 to a setting which will bring the atmospheric pressure in the headspace 31 to the predetermined level. A computer manual section 59 is provided in the conductor 58 for setting and adjusting the control points of the computer.

There has thus been described a pressure control system for regulating the pressure in the headspace 31 at a slight positive pressure, on the order of 0.01 inch of water, independently of the pressure in the melting section. A pressure control system such as illustrated significantly improves the thermal homogeneity and sheet forming quality of the molten glass and thereby minimizes optical defects in the glass ribbon formed therefrom.

It is to be understood that the form of the invention herewith shown and described is to be taken as an illustrative embodiment only of the same, and that various changes in the shape, size and arrangement of the parts may be resorted to without departing from the spirit of the invention.

We claim:

1. In a method of operating a glass melting furnace for producing a continuous ribbon of glass substantially free of optical defects, the furnace being of the type including an enclosed tank containing a mass of molten glass flowing from its melting end towards its working end and wherein the headspace above the molten glass in the working end is separated from the heaspace above the molten glass in the melting end to provide a confined atmosphere over the molten glass in said working end within which the pressure tends to increase as the molten glass is refined, the improvement comprising the steps of:
    a. venting the confined atmosphere of the headspace over the molten glass in the working end of the furnace to the surrounding external atmosphere;
    b. dampering the venting of said confined atmosphere for controlling the pressure in the confined atmosphere;
    c. sensing the pressure of said confined atmosphere and of the external atmosphere and producing a control signal in response to the relationship therebetween; and
    d. employing the control signal for regulating the dampering of the venting of the confined atmosphere for maintaining the pressure of the confined atmosphere at a level slightly higher than the pressure of the external atmosphere for preventing the ingress of the external atmosphere into said confined atmosphere and the egress of the confined atmosphere therefrom, thereby preventing the formation of disturbing air currents in the confined atmosphere whereby a glass ribbon produced from the molten glass in the working end is of substantially improved optical quality.

2. A method of operating a glass melting furnace as claimed in claim 1, wherein said confined atmosphere is maintained at a pressure of about 0.01 inch of water greater than said external atmosphere.

3. In an enclosed tank-type glass melting furnace of the type having a melting end and a working end and containing a mass of molten glass flowing from the melting end toward the working end wherein the headspace above the molten glass in the working end is partitioned from the headspace above the molten glass in the melting end to form a confined atmosphere over the molten glass in the working end wherein the pressure of the confined atmosphere tends to build up during refining of the molten glass in the working end, the improvement comprising:
    a. means for venting the confined atmosphere to the external atmosphere;
    b. means disposed within said venting means for dampering flow between the confined atmosphere and the external atmosphere;
    c. means for sensing the pressure of the confined atmosphere;
    d. means for sensing the pressure of the external atmosphere; and
    e. means operatively associated with each said pressure sensing means for operating said dampering means whereby the pressure of the confined atmosphere is maintained at a level slightly above the pressure of the external atmosphere for preventing ingress of external atmosphere into said confined atmosphere, thereby preventing the formation of disturbing air currents in said confined atmosphere whereby molten glass taken from the working end of the melting furnace is of substantially improved optical quality.

4. A tank-type glass melting furnace as claimed in claim 3, wherein said venting means comprises a duct and an ejector stack, and said damper means is a butterfly valve located in said duct.

5. A tank-type glass melting furnace as claimed in claim 4, wherein said means operatively associated with each said pressure sensing means produces a control signal regulating the setting of said butterfly valve in said duct for maintaining the pressure of said confined atmosphere at said level for preventing the formation of said disturbing air currents.

* * * * *

UNITED STATES PATENT AND TRADEMARK OFFICE
CERTIFICATE OF CORRECTION

PATENT NO. : 3,998,615
DATED : December 21, 1976
INVENTOR(S) : Clarence A. Gartz, Jr. et al It is certified that error appears in the above-identified patent and that said Letters Patent are hereby corrected as shown below:

Col. 5, line 17, "section" should be --station--

Col. 5, line 43, "heaspace" should be --headspace--

Signed and Sealed this

Twenty-second Day of March 1977

[SEAL]

Attest:

RUTH C. MASON
*Attesting Officer*

C. MARSHALL DANN
*Commissioner of Patents and Trademarks*